US008153041B2

(12) United States Patent
Okada et al.

(10) Patent No.: US 8,153,041 B2
(45) Date of Patent: Apr. 10, 2012

(54) CRYSTALLINE POLYMER MICROPOROUS MEMBRANE, METHOD FOR PRODUCING SAME, AND FILTER FOR FILTRATION

(75) Inventors: Hidetaka Okada, Minato-ku (JP); Kouhei Kawahara, Minami-ashigara (JP); Toshiki Taguchi, Minato-ku (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/944,367

(22) Filed: Nov. 11, 2010

(65) Prior Publication Data
US 2011/0049044 A1    Mar. 3, 2011

Related U.S. Application Data

(62) Division of application No. 12/299,946, filed as application No. PCT/JP2007/060236 on May 18, 2007, now abandoned.

(30) Foreign Application Priority Data

May 19, 2006  (JP) ................. 2006-140278
Jul. 28, 2006  (JP) ................. 2006-206103

(51) Int. Cl.
*B27J 5/00* (2006.01)
*B29C 67/00* (2006.01)
*D02J 1/22* (2006.01)
*B01D 39/00* (2006.01)

(52) U.S. Cl. .................. 264/127; 264/288.4; 264/288.8; 264/210.7; 264/532; 428/212; 210/500.36

(58) Field of Classification Search ............ 210/500.27, 210/490, 500.36; 264/532, 127, 288.8, 241, 264/41, 288.4, 210.7; 428/212, 218, 310.5, 428/221, 224, 422, 311.51; 156/182, 273, 156/275.5; 521/134
See application file for complete search history.

(56) References Cited

U.S. PATENT DOCUMENTS

| 3,953,566 | A | 4/1976 | Gore |
| 4,082,893 | A | 4/1978 | Okita |
| 4,277,429 | A | 7/1981 | Okita |
| 4,598,011 | A | 7/1986 | Bowman |
| 4,873,037 | A | 10/1989 | Chau et al. |
| 4,876,051 | A | 10/1989 | Campbell et al. |
| 4,902,423 | A | 2/1990 | Bacino |
| 4,945,125 | A | 7/1990 | Dillon et al. |
| 5,157,058 | A | 10/1992 | Dillon et al. |
| 5,217,666 | A * | 6/1993 | Tamaru et al. ............... 264/112 |
| 5,225,131 | A | 7/1993 | Tamaru et al. |
| 5,234,739 | A | 8/1993 | Tanaru et al. |
| 5,234,751 | A | 8/1993 | Harada et al. |
| 5,474,824 | A | 12/1995 | Martakos et al. |
| 5,545,475 | A * | 8/1996 | Korleski ................. 428/306.6 |
| 5,552,100 | A | 9/1996 | Shannon et al. |
| 5,635,257 | A * | 6/1997 | Nishii et al. ................ 427/554 |
| 5,814,405 | A * | 9/1998 | Branca et al. ........... 428/311.51 |
| 5,910,277 | A | 6/1999 | Ishino et al. |
| 5,980,799 | A | 11/1999 | Martakos et al. |
| 6,110,333 | A | 8/2000 | Spethmann et al. |
| 6,235,377 | B1 | 5/2001 | Dillon et al. |
| 6,596,112 | B1 | 7/2003 | Ditter et al. |
| 6,827,737 | B2 | 12/2004 | Hill et al. |
| 6,852,223 | B2 | 2/2005 | Huang et al. |
| 7,060,210 | B2 | 6/2006 | Roberts |

FOREIGN PATENT DOCUMENTS

| JP | 62-254806 A | 11/1987 |
| JP | 63-248405 A | 10/1988 |
| JP | 4-265133 A | 9/1992 |
| JP | 2001-157827 A | 6/2001 |

OTHER PUBLICATIONS

Form PCT/ISA/210 (International Search Report) dated Aug. 21, 2007.
Non-English version of Form PCT/ISA/237 (Written Opinion of the International Searching Authority) dated Aug. 21, 2007.
Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2007/060236, Dec. 24, 2008, The International Bureau of WIPO, Geneva, CH.

* cited by examiner

*Primary Examiner* — Ana Fortuna
(74) *Attorney, Agent, or Firm* — Buchanan Ingersoll & Rooney PC

(57) ABSTRACT

To provide a membrane capable of efficiently collecting fine particles for a long period of time, disclosed is a polytetrafluoroethylene microporous membrane wherein the mean pore size in the surface of the membrane is larger than the mean pore size in the back thereof and the mean pore size continuously changes from the surface toward the back.

11 Claims, No Drawings

CRYSTALLINE POLYMER MICROPOROUS MEMBRANE, METHOD FOR PRODUCING SAME, AND FILTER FOR FILTRATION The present application is a Divisional Application of U.S. application Ser. No. 12/299,946, filed Nov. 7, 2008 now abandoned, which is the National Stage of International Application No. PCT/JP2007/060236, filed May 18, 2007, and claims foreign priority to Japanese Application No. 2006-140278, filed May 19, 2006, and Japanese Application No. 2006-206103, filed Jul. 28, 2006, the entire contents of each of which are incorporated by reference herein.

TECHNICAL FIELD

The present invention relates to a microporous membrane for use for precision filtration of liquid, and to a method for its production. More precisely, the invention relates to a microporous membrane having a good filtration efficiency, and to a method for its production.

BACKGROUND ART

Microporous membranes are known for a long time (e.g., see Non-Patent Reference 1), and are widely used for filters for filtration, etc. Microporous membranes include ones produced from a starting material of cellulose ester (e.g., see Patent References 1 to 7), ones produced from a starting material of aliphatic polyamide (e.g., see, Patent References 8 to 14), ones produced from a starting material of polyfluorocarbon (e.g., see Patent References 15 to 18), ones from a starting material of polypropylene (e.g., see Patent Reference 19), etc. These microporous membranes are used for filtration and sterilization for washing water for electronic industry, water for medicines, water for production of medicines, water for foods, etc., and their applications and amounts to be used are enlarging these days, and in particular, microporous membranes having high reliability are specifically noted from the viewpoint of collecting particles. Above all, microporous membranes of a crystalline polymer are excellent in chemical resistance, and in particular, membranes produced from a starting material of polytetrafluoroethylene are excellent in heat resistance and chemical resistance, and the demand for them is increasing remarkably.

In general, the filtration capacity of a microporous membrane per the unit area is small (that is, the filtration life is short). Accordingly, in industrial use, a large number of filtration units must be combined in parallel with each other and used for increasing the membrane area, and from the viewpoint of reducing the cost in a process of filtration, it is desired to prolong the filtration life. From this viewpoint, heretofore, as a membrane effective for preventing flow rate reduction owing to pore blocking or the like, an asymmetric membrane has been developed, in which the pore size gradually decreases from the inlet side toward the outlet side of the liquid to be filtered through it (see Patent References 20 and 21). In addition, proposed are a polytetrafluoroethylene double-layered porous membrane that comprises a filtration layer having a small pore size and a support layer having a pore size larger than that of the filtration layer (see Patent Reference 22), and a membrane produced by applying a polytetrafluoroethylene emulsified dispersion onto a polytetrafluoroethylene sheet and stretching it (see Patent Reference 23).

Patent Reference 1: U.S. Pat. No. 1,421,341
Patent Reference 2: U.S. Pat. No. 3,133,132
Patent Reference 3: U.S. Pat. No. 2,944,017
Patent Reference 4: JP-B 43-15698
Patent Reference 5: JP-B 45-3313
Patent Reference 6: JP-B 48-39586
Patent Reference 7: JP-B 48-40050
Patent Reference 8: U.S. Pat. No. 2,783,894
Patent Reference 9: U.S. Pat. No. 3,408,315
Patent Reference 10: U.S. Pat. No. 4,340,479
Patent Reference 11: U.S. Pat. No. 4,340,480
Patent Reference 12: U.S. Pat. No. 4,450,126
Patent Reference 13: German Patent 3,138,525
Patent Reference 14: JP-A 58-37842
Patent Reference 15: U.S. Pat. No. 4,196,070
Patent Reference 16: U.S. Pat. No. 4,340,482
Patent Reference 17: JP-A 55-99934
Patent Reference 18: JP-A 58-91732
Patent Reference 19: West German OLS 3,003,400
Patent Reference 20: JP-B 55-6406
Patent Reference 21: JP-B 4-68966
Patent Reference 22: JP-A 4-351645
Patent Reference 23: JP-A 7-292144
Non-Patent Reference 1: R. Kesting's Synthetic Polymer Membrane (published by McGraw Hill)

DISCLOSURE OF THE INVENTION

Problems that the Invention is to Solve

However, even though a crystalline polymer, such as typically polytetrafluoroethylene is used for realizing the techniques described in Patent References 20 and 21, there is a great difficulty from the viewpoint of forming membranes. In particular, polytetrafluoroethylene could dissolve only in an extremely specific solvent, and it is impossible to produce a microporous membrane having a gradually decreasing pore size. Accordingly, when the obtained membrane is used for filtration, then there occurs a problem in that the flow rate reduces owing to pore blocking, etc. According to the techniques described in Patent References 22 and 23, the problem could be reduced, but on the other hand, there occurs another problem in that the coated and dried membrane is often cracked to have defects. In addition, since only the surface has a small pore size, there is still another problem in that a sufficient filtration life could not be attained.

In consideration of these prior-art problems, the present inventors have pushed forward investigations for the purpose of providing a crystalline polymer microporous membrane capable of efficiently collecting fine particles and having a long filtration life.

Means for Solving the Problems

The present inventors have assiduously studied and, as a result, have found that a crystalline polymer microporous membrane produced by contact of a heating roll with an unbaked crystalline polymer film to semi-bake it can solve the prior-art problems. Specifically, as a means for solving the problems, the inventors herein provide the present invention described below.

(1) A crystalline polymer microporous membrane characterized in that the mean pore size in the surface of the membrane is larger than the mean pore size in the back thereof and that the mean pore size continuously changes from the surface toward the back.

(2) The crystalline polymer microporous membrane of (1), wherein dD/dt in the surface of the membrane (in which D indicates the mean pore size, and t indicates the distance from the surface in the thickness direction) is negative.

(3) The crystalline polymer microporous membrane of (2), wherein dD/dt in the back of the membrane is larger than dD/dt in the surface of the membrane.

(4) A single-layered crystalline polymer microporous membrane characterized in that the mean pore size in the surface of the membrane is larger than the mean pore size in the back thereof.

(5) The single-layered crystalline polymer microporous membrane of (4), which has a face having a mean pore size smaller than the mean pore size in the surface of the membrane and larger than the mean pore size in the back thereof.

(6) The crystalline polymer microporous membrane of (4) or (5), wherein the mean pore size continuously reduces from the surface of the membrane toward the back thereof.

(7) The crystalline polymer microporous membrane of any one of (1) to (6), wherein the crystalline polymer is a polyalkylene.

(8) The crystalline polymer microporous membrane of any one of (1) to (6), wherein the crystalline polymer is a polytetrafluoroethylene.

(9) A method for producing a crystalline polymer microporous membrane, characterized by comprising semi-baking an unbaked film according to a process of imparting thermal energy to the surface of the film to thereby form a temperature gradient in the thickness direction of the film.

(10) A method for producing a crystalline polymer microporous membrane, characterized by comprising semi-baking an unbaked film under a condition under which thermal energy can be applied more to the surface of the film than to the back thereof.

(11) The method for producing a crystalline polymer microporous membrane of (9) or (10), wherein the semi-baking is conducted continuously.

(12) The method for producing a crystalline polymer microporous membrane of (11), wherein the semi-baking is conducted continuously by heating the surface of the unbaked film and cooling the back thereof.

(13) The method for producing a crystalline polymer microporous membrane of (9) or (10), wherein the semi-baking is conducted intermittently.

(14) The method for producing a crystalline polymer microporous membrane of (13), wherein the semi-baking is conducted intermittently by intermittently heating and cooling the surface of the unbaked film and preventing the temperature elevation in the back thereof.

(15) The method for producing a crystalline polymer microporous membrane of (9) or (10), wherein a heating roll is contacted with the surface of the unbaked film to semi-bake it.

(16) The method for producing a crystalline polymer microporous membrane of (15), wherein the heating roll has a temperature under which the crystal condition varies.

(17) The method for producing a crystalline polymer microporous membrane of (16), wherein the crystalline polymer is a polytetrafluoroethylene and the temperature of the heating roll is from 327 to 345° C.

(18) The method for producing a crystalline polymer microporous membrane of any one of (9) to (16), wherein the crystalline polymer is a polyalkylene.

(19) The method for producing a crystalline polymer microporous membrane of any one of (9) to (16), wherein the crystalline polymer is a polytetrafluoroethylene.

(20) The method for producing a crystalline polymer microporous membrane of any one of (9) to (19), further comprising stretching the semi-baked film in at least one direction.

(21) The method for producing a crystalline polymer microporous membrane of any one of (9) to (19), further comprising stretching the semi-baked film biaxially.

(22) A crystalline polymer microporous membrane produced by the method for producing a crystalline polymer microporous membrane of any one of (9) to (21).

(23) A filter for filtration, comprising the crystalline polymer microporous membrane of anyone of (1) to (8) and (22).

(24) A filter for filtration produced by working the crystalline polymer microporous membrane of any one of (1) to (8) and (22) into a pleated one.

(25) The filter for filtration of (23) or (24), which is used with its surface side having a larger pore size kept as the filtration face of the filter.

ADVANTAGE OF THE INVENTION

The crystalline polymer microporous membrane and the filter for filtration comprising it of the invention can efficiently collect fine particles in filtration in which the face (surface) of the membrane having a larger mean pore size is set on the inlet side. In addition, since the membrane has a large specific surface area, fine particles may be effectively removed by adsorption or adhesion before they reach the area having a smallest pore size of the membrane, and the filtration life of the membrane can be greatly prolonged. Further, according to the production method of the invention, the crystalline polymer microporous membrane having such characteristic effects can be produced efficiently.

BEST MODE FOR CARRYING OUT THE INVENTION

The crystalline polymer microporous membrane and its production method and the filter for filtration of the invention are described in detail hereinunder. The description of the constitutive elements of the invention given hereinunder may be for some typical embodiments of the invention, to which, however, the invention should not be limited. In this application, the numerical range expressed by the wording "a number to another number" means the range that falls between the former number indicating the lowermost limit of the range and the latter number indicating the uppermost limit thereof.

The crystalline polymer in the invention means a polymer comprising a crystalline region where long chain molecules are aligned regularly and an amorphous region where molecules are not aligned regularly, as mixed at random in the molecular structure. The resin of the type may express crystallinity when processed physically.

For example, when a polyethylene film is stretched by external force, then the film that is originally transparent becomes cloudy. This is because the molecular arrangement inside the polymer is aligned in one direction by the external force, and the polymer thereby comes to express crystallinity.

Examples of the crystalline polymer include polyalkylenes, polyesters, polyamides, polyethers, liquid-crystal polymers, etc.; and there are mentioned polyethylene, polypropylene, nylon, polyacetal, polybutylene terephthalate, polyethylene terephthalate, syndiotactic polystyrene, polyphenylene sulfide, polyether ether ketone, whole aromatic polyamide, whole aromatic polyester, fluororesin, polyether nitrile, etc.

Above all, polyalkylenes (e.g., polyethylene and polyethylene), especially polyfluoroalkylenes in which the hydrogen atoms of the alkylene group are partly or wholly substituted with fluorine atoms are preferably used in the invention from the viewpoint of their chemical resistance and handlability; and in particular, more preferred is polytetrafluoroethylene.

Regarding polyethylene, it is well known that its density varies depending on its branching degree. In general, one having a large branching degree and having a low degree of crystallinity is grouped as a low-density polyethylene (LDPE); one having a small branching degree and having a high degree of crystallinity is as a high-density polyethylene (HDPE). In the invention both of them are usable. Above all, HDPE is preferred from the viewpoint of crystallinity control.

Preferably, the crystalline polymer for use in the invention has a glass transition temperature of from 40 to 400° C., more preferably from 50 to 350° C. The weight-average molecular weight of the crystalline polymer for use in the invention is preferably from 1,000 to 100,000,000. Also preferably, the number-average molecular weight of the crystalline polymer for use in the invention is from 500 to 50,000,000.

Crystalline Polymer Microporous Membrane:

One characteristic feature of the crystalline polymer microporous membrane of the invention is that the mean pore size in the surface thereof is larger than the mean pore size in the back thereof. The mean pore size as referred to herein may be determined according to the method mentioned below. Concretely, using a scanning electromicroscope (Hitachi S-4000 Model; for vapor deposition, Hitachi E1030 Model), a photographic picture of the membrane surface is taken (SEM picture, at 1000 to 5000-power), and the picture information is inputted into an image processor (hardware, Nippon Avionics' TV Image Processor TVIP-4100II; control software, Ratox System Engineering's TV Image Processor Image Command 4198), and resolved into an image of fibers alone. The image is analyzed by computation to give the mean pore size of the membrane.

Preferably, of the crystalline polymer microporous membrane of the invention, the ratio of the mean pore size in the surface to that in the back (surface/back ratio) is from 5 to 30 times, more preferably from 10 to 25 times, even more preferably from 15 to 20 times.

In this application, the face having a larger mean pore size is referred to as "surface", and the face having a smaller mean pore size is referred to as "back"; however, these are names given thereto for convenience sake for facilitating the understanding of the invention. Accordingly, any face of the unbaked crystalline polymer film used in the production method to be mentioned hereinunder may be the "surface" of the semi-baked membrane.

The crystalline polymer microporous membrane of the invention includes another characteristic feature, in addition to the above-mentioned characteristic feature, in that the mean pore size continuously changes from the surface toward the back thereof (first embodiment), and still another characteristic feature, in addition to the above-mentioned characteristic feature, in that the membrane has a single-layered structure (second embodiment). Having these additional characteristic features, the filtration life of the membrane can be effectively prolonged.

"The mean pore size continuously changes from the surface toward the back" in the first embodiment means that, in a graphic expression where the horizontal axis indicates the distance d from the surface in the thickness direction (corresponding to the depth from the surface) and the vertical axis indicates the mean pore size D, the graph is drawn as one continuous line. The graph from the surface (d=0) to the back (d=film thickness) may be a negative inclination region (dD/dt<0) alone, or may comprise a negative inclination region and a zero inclination region (dD/dt=0) as combined at random, or may comprise a negative inclination region and a positive inclination region (dD/dt>0) as combined at random. Preferably, the graph is a negative inclination region (dD/dt<0) alone, or comprises a negative inclination region and a zero inclination region (dD/dt=0) as combined at random. More preferred is a negative inclination region (dD/dt<0) alone.

Preferably, at least the surface of the membrane is in the negative inclination region. In the negative inclination region (dD/dt<0), the inclination may be all the time constant or may differ. For example, in case where a polytetrafluoroethylene microporous membrane of the invention has a negative inclination region (dD/dt<0) alone, it may have an embodiment where dD/dt in the surface of the membrane is larger than dD/dt in the back of the membrane. It may also have an embodiment where dD/dt gradually increases from the surface of the membrane toward the back thereof (an embodiment where the absolute value decreases).

From the "single-layered structure" in the second embodiment, excluded is a multi-layered structure to be formed by sticking or laminating 2 or more layers. Specifically, the "single-layered structure" in the second embodiment means a structure that does not have a boundary between layers existing in a double-layered structure. In the second embodiment, the membrane preferably has a face having a mean pore size smaller than the mean pore size in the surface of the membrane and larger than the mean pore size in the back thereof.

Preferably, the crystalline polymer microporous membrane of the invention has both the characteristic of the first embodiment and the characteristic of the second embodiment. Specifically, the membrane is a single-layered one in which the mean pore size in the surface of the membrane is larger than the mean pore size in the back thereof and the mean pore size continuously changes from the surface of the membrane toward the back thereof. The microporous membrane of the type may more efficiently collect fine particles when used in filtration from its surface side, and its filtration life may be greatly prolonged, and it can be produced easily and inexpensively.

Preferably, the thickness of the crystalline polymer microporous membrane of the invention is from 1 to 300 μm, more preferably from 5 to 100 μm, even more preferably from 10 to 80 μm.

In particular, when the total thickness of the crystalline polymer microporous membrane of the invention is taken as 10, and the mean pore size in the part 1 from the surface in the depth direction of the membrane is represented by P1 and the mean pore size in the part 9 is by P2, then P1/P2 preferably falls within a range of from 2 to 10000, more preferably from 3 to 100.

Production Method for Crystalline Polymer Microporous Membrane:

A method for producing the crystalline polymer microporous membrane of the invention is described below. In the following description, a preferred production process for the crystalline polymer microporous membrane of the invention is referred to; however, the crystalline polymer microporous membrane of the invention should not be limited to those produced according to the concrete production method.

In producing the crystalline polymer microporous membrane of the invention, preferably, an unbaked crystalline polymer film is first prepared.

The type of the crystalline polymer starting material to be used in producing the unbaked crystalline polymer film is not specifically defined, and the above-mentioned crystalline polymers may be favorably used. Especially in the invention, polyethylene or a crystalline polymer derived from it by substituting the hydrogen atom therein with a fluorine atom may be used; and polytetrafluoroethylene is especially preferably used.

The crystalline polymer to be used as the starting material preferably has a number-average molecular weight of from 500 to 50,000,000, more preferably from 1,000 to 10,000,000.

Especially in the production method of the invention, polyethylene is preferred, and for example, polytetrafluoroethylene may be used. As the polytetrafluoroethylene, in general, polytetrafluoroethylene produced according to an emulsion polymerization method may be used; and preferably, fine powdery polytetrafluoroethylene collected by coagulation of an aqueous dispersion obtained in emulsion polymerization may be used. The number-average molecular weight of polytetrafluoroethylene to be used as the starting material is generally from 2,500,000 to 10,000,000, preferably from 3,000,000 to 8,000,000. In the invention, polytetrafluoroethylene materials sold in the market may be suitably selected and used as the starting material of polytetrafluoroethylene. For example, Daikin Industry's "Polyflon Fine Powder F104U" and the like are preferably used.

In the invention, preferably, the film is produced by preparing a mixture of a crystalline polymer starting material and an extrusion promoter, then extruding it as a paste and rolling it. As the extrusion promoter, preferred is a liquid lubricant, concretely including solvent naphtha, white oil, etc. As the extrusion promoter, usable is a hydrocarbon oil such as "Isopar" sold in the market by Esso Petroleum. Preferably, the extrusion promoter is used in an amount of from 20 to 30 parts by mass relative to 100 parts by mass of the crystalline polymer.

Paste extrusion is effected generally at 50 to 80° C. The extrusion shape is not specifically defined, but in general, preferred is rod-like extrusion. The extruded matter is then rolled into a film. The rolling may be, for example, calendering with a calender roll at a speed of 50 m/min. The rolling temperature may be generally set at 50 to 70° C. Next, preferably, the film is heated to remove the extrusion promoter thereby giving an unbaked crystalline polymer film. The heating temperature may be suitably determined depending on the type of the crystalline polymer used, but in general it may be from 40 to 400° C., preferably from 60 to 350° C. In particular, when tetrafluoroethylene is used, the temperature is generally set at 150 to 280° C., preferably at 200 to 255° C. The heating may be effected according to a method of leading the film to pass through a hot air drying furnace. The thickness of the thus-produced, unbaked crystalline polymer film may be suitably determined depending on the thickness of the crystalline polymer microporous membrane to be finally produced herein. In case where the film is stretched in the later step, the thickness reduction owing to the stretching must be taken into consideration in controlling the film thickness.

In preparing the unbaked crystalline polymer film, the matters described in Polyflon Handbook (by Daikin, 1983 revised edition) may be suitably referred to.

In the production method of the invention, the unbaked crystalline polymer film is semi-baked. In this application, semi-baking means that the crystalline polymer is heated at a temperature not lower than the melting point of the baked polymer but not higher than the (melting point of the unbaked polymer+15° C.). In this application, the unbaked crystalline polymer means the polymer not processed for heat treatment for baking. Its melting point means the temperature at the peak appearing in the endothermic curve of the unbaked crystalline polymer analyzed with a differential scanning calorimeter. The melting point of the baked polymer and the melting point of the unbaked polymer both vary depending on the type, the mean molecular weight and others of the crystalline polymer, but may be generally from 50 to 450° C., preferably from 80 to 400° C.

The temperature may be considered as follows: Specifically, for example, in a case of polytetrafluoroethylene, the melting point of the baked polymer is about 324° C., and the melting point of the unbaked polymer is about 345° C. Accordingly, in order to semi-bake a polymer, polytetrafluoroethylene, it may be heated at about 327 to 360° C., preferably at 335 to 350° C., for example at a temperature of 345° C. The semi-baked polymer includes one having a melting point of about 324° C. and one having a melting point of about 345° C. as mixed therein.

The semi-baking may be attained according to a method of applying thermal energy to the surface of the unbaked film thereby forming a temperature gradient in the direction of the thickness of the film and/or a method of applying a larger quantity of thermal energy to the surface of the film than to the back thereof. Semi-baking the film under the condition may control the degree of baking asymmetrically in the thickness direction, therefore producing with ease the crystalline polymer microporous membrane of the first embodiment of the invention. Regarding the degree of baking as referred to herein, the description given in JP-A 5-202217 may be referred to.

Regarding the temperature gradient in the direction of the film thickness, preferably the temperature difference between the surface and the back is at least 30° C., more preferably at least 50° C.

For thermal energy supply, employable is any of a method of continuously supplying it during the process of the invention, or a method of supplying it intermittently as divided into some portions. Because of the definition of the above-mentioned semi-baking step, the temperature difference between the surface and the back of the membrane must be generated, for which is employable a method of intermittently supplying energy to thereby prevent the temperature elevation in the back of the membrane. On the other hand, when thermal energy is applied continuously, also effectively employable is a method of cooling the back simultaneously with heating the surface, for keeping the temperature gradient.

For thermal energy supply, various methods are employable, including a method of blowing hot air, a method of contacting with a heat carrier, a method of contacting with a heated material, a method of irradiating with heat rays, a method of heating with electromagnetic waves such as microwaves, etc. Though not specifically limited thereto, preferred is a method of contacting a heating matter with the surface of the film. The heating matter is preferably a heating roll. The heating roll may continuously semi-bake the film in an industrial assembly-line system, in which, in addition, the temperature control and the system maintenance are easy. The temperature of the heating roll may be set at the temperature in the process of producing the semi-baked membrane. The time for which the film is kept in contact with the heating roll is one necessary for sufficient proceeding of the intended semi-baking, and in general, it may be from 30 seconds to 120 seconds, preferably from 45 seconds to 90 seconds, more preferably 60 seconds to 80 seconds.

On the contrary, in case where the process of cooling the back is carried out, employable are various methods such as a method of blowing cold water, a method of contacting with a coolant, a method of contacting with a cooled material, a method of spontaneous cooling, etc. Though not specifically limited thereto, preferred is a method of contacting the surface of the film with a cooling matter to cool it. As the cooling matter, especially preferred is a cooling roll. The cooling roll may continuously semi-bake the film in an industrial assembly-line system, like in the case of heating the surface of the film, and in addition, it facilitates temperature control and system maintenance. The temperature of the cooling roll may be set at a temperature at which there may occur the temperature difference in producing the semi-baked membrane. The time for which the film is kept in contact with the cooling roll is one necessary for sufficient proceeding of the intended semi-baking, and on the presumption that the cooling step goes on simultaneously with the heating step, the time may be generally from 30 seconds to 120 seconds, preferably from 45 seconds to 90 seconds, more preferably 60 seconds to 80 seconds.

The surface material of the heating and cooling roll may be generally stainless steel of good durability, especially SUS316. In the production method of the invention, preferably, the film surface is contacted with a heating and cooling roll, and a roller of which the temperature is set lower than the temperature of the heating and cooling roll may be contacted with the back of the film. For example, a roller kept at room temperature may be contacted under pressure with the back of the film so that the heating roll could be fitted to the film. Before and after contact with the heating roll, the back of the film may be contacted with a guide roll.

Preferably, the semi-baked film is then stretched. The stretching is preferably effected both in the machine direction and in the cross direction. The film may be successively stretched in the machine direction and in the cross direction, or may be simultaneously biaxially stretched.

In case where the film is stretched successively in the machine direction and in the cross direction, preferably, the film is first stretched in the machine direction and then in the cross direction. The draw ratio in stretching in the machine direction may be generally at least 4 times, preferably at least 8 times, more preferably at least 10 times. The stretching temperature in the machine direction may be generally from 100° C. to 300° C., preferably from 200° C. to 300° C., more preferably about 270° C. The draw ratio in stretching in the cross direction may be generally from 10 to 100 times, preferably from 12 to 90 times, more preferably from 15 to 70 times, even more preferably from 20 to 40 times. The stretching temperature in the cross direction may be generally from 100° C. to 300° C., preferably from 200° C. to 300° C., more preferably about 270° C. The areal draw ratio may be generally at least 50 times, preferably at least 75 times, more preferably at least 100 times. Before stretching it, the film may be pre-heated at a temperature not higher than the stretching temperature.

After stretched, if desired, the film may be thermally fixed. The temperature for thermal fixation may be generally from the stretching temperature to lower than the melting point of the baked crystalline polymer material.

Filter for Filtration:

The crystalline polymer microporous membrane of the invention has various applications. In particular, when it is used as a filter for filtration, the filter may effectively exhibit the characteristics of the crystalline polymer microporous membrane of the invention.

In case where the crystalline polymer microporous membrane of the invention is used as a filter for filtration, its surface (having a larger mean pore size) is kept on the inlet side in filtration. Specifically, the surface of the membrane is used as the filtration face of the filter.

The crystalline polymer microporous membrane of the invention has a relatively large specific surface area, and therefore the fine particles having penetrated into the membrane through its surface can be removed by adsorption or adhesion before they reach the smallest pore size region. Accordingly, the filter hardly suffers from pore blocking and can keep a high filtration efficiency for a long period of time.

For example, when the filter for filtration of the invention is used for filtration under a differential pressure of 0.1 kg/cm$^2$, it enables filtration of at least 5 ml/cm$^2$·min.

Further, the filter for filtration of the invention is preferably worked into a pleated one. The advantage of the pleated filter is that the effective surface area of the filter for filtration per cartridge is increased.

The filter for filtration comprising the crystalline polymer microporous membrane of the invention is characterized in that its filtration function is good and its life is long, and therefore, it realizes a compact filtration device. In conventional filtration devices, a large number of filtration units are combined in parallel with each other to overcome the drawback of the shortness of filtration life; however, when the filter for filtration of the invention is used, the number of the filtration units to be used as combined in parallel with each other may be greatly reduced. In addition, the period of time for which the filter for filtration may be used as such with no exchange may be significantly prolonged, and therefore, the cost and the time for maintenance can be reduced.

The filter for filtration of the invention may be used in various conditions in which filtration is needed. For example, it may be used for filtration and sterilization for washing water for electronic industry, water for medicines, water for production of medicines, water for foods, etc. In particular, the filter for filtration of the invention has excellent heat resistance and chemical resistance, and therefore it may be effectively used for high-temperature filtration or filtration for reactive chemicals to which conventional filters could not be applied.

The characteristics of the invention are described more concretely with reference to the following Examples and Comparative Examples. In the following Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

EXAMPLES WITH POLYTETRAFLUOROETHYLENE

Example 1

27 parts by mass of an extrusion promoter, hydrocarbon oil (Esso Petroleum's "Isopar") was added to 100 parts by mass of a polytetrafluoroethylene fine powder having a number-average molecular weight of 6,200,000 (Daikin Industry's "Polyflon Fine powder F104U"), and paste-wise extruded out into round rods; and these were calendered with a calender roll heated at 70° C., at a speed of 50 m/min to give a polytetrafluoroethylene film. The film was led to pass through a hot air drying furnace at 250° C. to remove the extrusion promoter by drying therein, thereby giving an unbaked polytetrafluoroethylene film having a mean thickness of 100 μm, a mean width of 150 mm and a specific gravity of 1.55.

The obtained unbaked film was baked for one minute with a roll (surface material: SUS316) heated at 345° C. thereby giving a semi-baked film.

The obtained semi-baked film was stretched in the machine direction at 270° C. by 12.5 times in a mode of roll-to-roll stretching, and once wound up around a winding roll. Next, the film was preheated at 305° C., and then stretched at 270°

C. in the cross direction by 30 times with both edges thereof held by clipping. Next, this was thermally fixed at 380° C. The areal draw ratio of the film was 260 times in terms of the elongated areal ratio. According to the above method, a polytetrafluoroethylene microporous membrane of Example 1 was produced.

Example 2

27 parts by mass of an extrusion promoter, hydrocarbon oil (Esso Petroleum's "Isopar") was added to 100 parts by mass of a polytetrafluoroethylene fine powder having a number-average molecular weight of 6,200,000 (Daikin Industry's "Polyflon Fine powder F104U"), and paste-wise extruded out into round rods; and these were calendered with a calender roll heated at 70° C., at a speed of 50 m/min to give a polytetrafluoroethylene film. The film was led to pass through a hot air drying furnace at 250° C. to remove the extrusion promoter by drying therein, thereby giving an unbaked polytetrafluoroethylene film having a mean thickness of 100 μm, a mean width of 150 mm and a specific gravity of 1.55.

The obtained unbaked film was baked by contacting it with one face (this is the surface) of a plate (surface material: SUS316) heated at 345° C. for 10 seconds, then this was removed from the plate, and left cooled at room temperature for 5 minutes. After thus cooled, the surface was again contacted with the same heating plate for 10 seconds, then this was removed from it and left cooled at room temperature for 5 minutes. This process was repeated 7 times. As a result of the intermittent heating process, a semi-baked film was obtained.

The obtained semi-baked film was stretched in the machine direction at 270° C. by 12.5 times in a mode of roll-to-roll stretching, and once wound up around a winding roll. Next, the film was preheated at 305° C., and then stretched at 270° C. in the cross direction by 30 times with both edges thereof held by clipping. Next, this was thermally fixed at 380° C. The areal draw ratio of the film was 270 times in terms of the elongated areal ratio. According to the above method, a polytetrafluoroethylene microporous membrane of Example 2 was produced.

Example 3

27 parts by mass of an extrusion promoter, hydrocarbon oil (Esso Petroleum's "Isopar") was added to 100 parts by mass of a polytetrafluoroethylene fine powder having a number-average molecular weight of 6,200,000 (Daikin Industry's "Polyflon Fine powder F104U"), and paste-wise extruded out into round rods; and these were calendered with a calender roll heated at 70° C., at a speed of 50 m/min to give a polytetrafluoroethylene film. The film was led to pass through a hot air drying furnace at 250° C. to remove the extrusion promoter by drying therein, thereby giving an unbaked polytetrafluoroethylene film having a mean thickness of 100 μm, a mean width of 150 mm and a specific gravity of 1.55.

The obtained unbaked film was baked by sandwiching it between a roll kept heated at 345° C. and a roll kept warmed at 30° C. (surface material of the two: SUS316) for 2 minutes, thereby giving a semi-baked film.

The obtained semi-baked film was stretched in the machine direction at 270° C. by 12.5 times in a mode of roll-to-roll stretching, and once wound up around a winding roll. Next, the film was preheated at 305° C., and then stretched at 270° C. in the cross direction by 30 times with both edges thereof held by clipping. Next, this was thermally fixed at 380° C. The areal draw ratio of the film was 260 times in terms of the elongated areal ratio. According to the above method, a polytetrafluoroethylene microporous membrane of Example 3 was produced.

Comparative Example

A polytetrafluoroethylene microporous membrane of Comparative Example was produced according to the same series of process steps as in Examples, for which, however, the baking was effected in an even at 345° C. for 1 minute to prepare a semi-baked film.

(Evaluation)

The membranes of Examples and the membrane of Comparative Example were tested for filtration. An aqueous solution containing 0.01% of polystyrene latex (mean particle size, 0.17 μm) was filtered under a differential pressure of 0.1 kg. As a result, the membrane of Comparative Example was substantially blocked at 500 ml/cm$^2$, but the membranes of Examples 1 to 3 of the invention attained the filtration up to 1300, 1100 and 1200 ml/cm$^2$, respectively; and this confirmed that the membranes of the invention had a significantly prolonged filtration life.

In Examples 1 to 3 and Comparative Example, the film thickness of the microporous membranes is taken as 10, and the mean pore size in the part 1 from the surface in the depth direction of the membrane is represented by P1 and the mean pore size in the part 9 is by P2.

| P1/P2 in those Examples is as follows: | |
|---|---|
| Example 1 | P1/P2 = 4.7 |
| Example 2 | P1/P2 = 4.3 |
| Example 3 | P1/P2 = 5.1 |
| Comparative Example | P1/P2 = 0.95 |

The data also confirm the effect of the invention.

Industrial Applicability

When the polytetrafluoroethylene microporous membrane and the filter for filtration comprising it of the invention are used, then fine particles can be collected efficiently for a long period of time. In addition, the polytetrafluoroethylene microporous membrane and the filter for filtration comprising it of the invention have excellent heat resistance and chemical resistance, and are therefore applicable to high-temperature filtration and filtration of reactive chemicals to which conventional filters could not be applied. Further, according to the production method of the invention, the polytetrafluoroethylene microporous membrane having such characteristics can be produced efficiently. Accordingly, there is a high probability that the present invention is effectively utilized in the industrial field relating to filters for filtration.

The invention claimed is:

1. A method for producing a crystalline polymer microporous membrane, comprising semi-baking an unbaked film which is an unexpanded single-layered film according to a process of imparting thermal energy to the surface of the film under a condition wherein the thermal energy is applied more to the surface of the film than to the back of the film to thereby form a temperature gradient in the thickness direction of the film and stretching the semi-baked film in at least one direction wherein the surface of the film is heated at a temperature not lower than the melting point of the baked polymer but not higher than the melting point of the unbaked polymer +15° C.

2. The method for producing a crystalline polymer microporous membrane according to claim 1, wherein the semi-baking is conducted continuously.

3. The method for producing a crystalline polymer microporous membrane according to claim 2, wherein the semi-baking is conducted continuously by heating the surface of the unbaked film and cooling the back thereof.

4. The method for producing a crystalline polymer microporous membrane according to claim 1, wherein the semi-baking is conducted intermittently.

5. The method for producing a crystalline polymer microporous membrane according to claim 4, wherein the semi-baking is conducted intermittently by intermittently heating and cooling the surface of the unbaked film and preventing the temperature elevation in the back thereof.

6. The method for producing a crystalline polymer microporous membrane according to claim 1, wherein a heating roll is contacted with the surface of the unbaked film to semi-bake it.

7. The method for producing a crystalline polymer microporous membrane according to claim 5, wherein the heating roll has a temperature under which the crystal condition varies.

8. The method for producing a crystalline polymer microporous membrane according to claim 6, wherein the crystalline polymer is a polytetrafluoroethylene and the temperature of the heating roll is from 327 to 345° C.

9. The method for producing a crystalline polymer microporous membrane according to claim 1, wherein the crystalline polymer is a polyalkylene.

10. The method for producing a crystalline polymer microporous membrane according to claim 1, wherein the crystalline polymer is a polytetrafluoroethylene.

11. The method for producing a crystalline polymer microporous membrane according to claim 1, comprising stretching the semi-baked film biaxially.

* * * * *